Dec. 2, 1958 — W. P. PERRY — 2,862,651
GRAVITY CONTROL APPARATUS
Filed Oct. 14, 1954 — 2 Sheets-Sheet 2
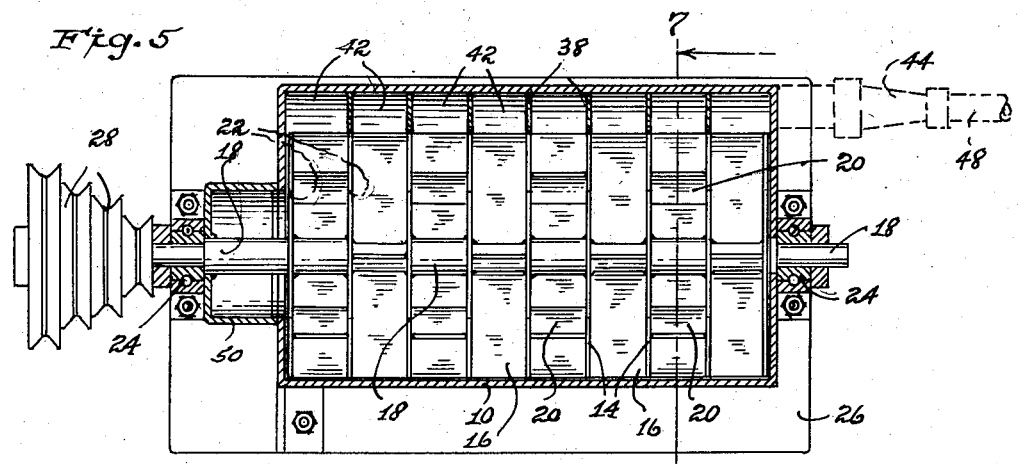
Fig. 5
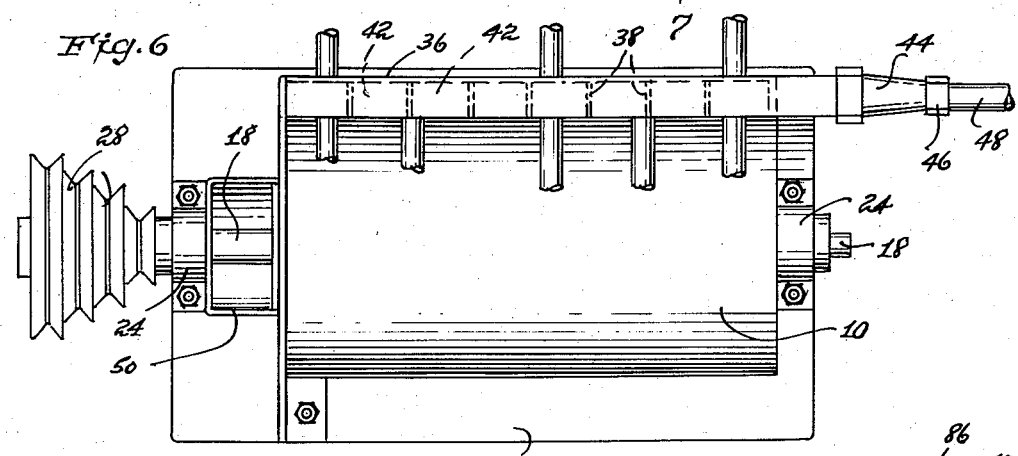
Fig. 6
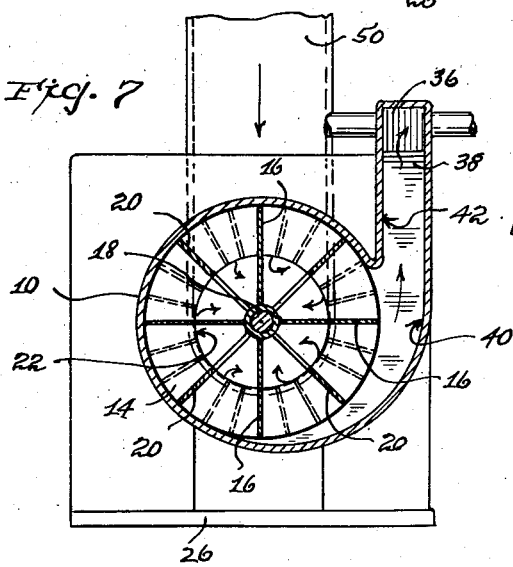
Fig. 7
Fig. 8
Willard P. Perry
INVENTOR.

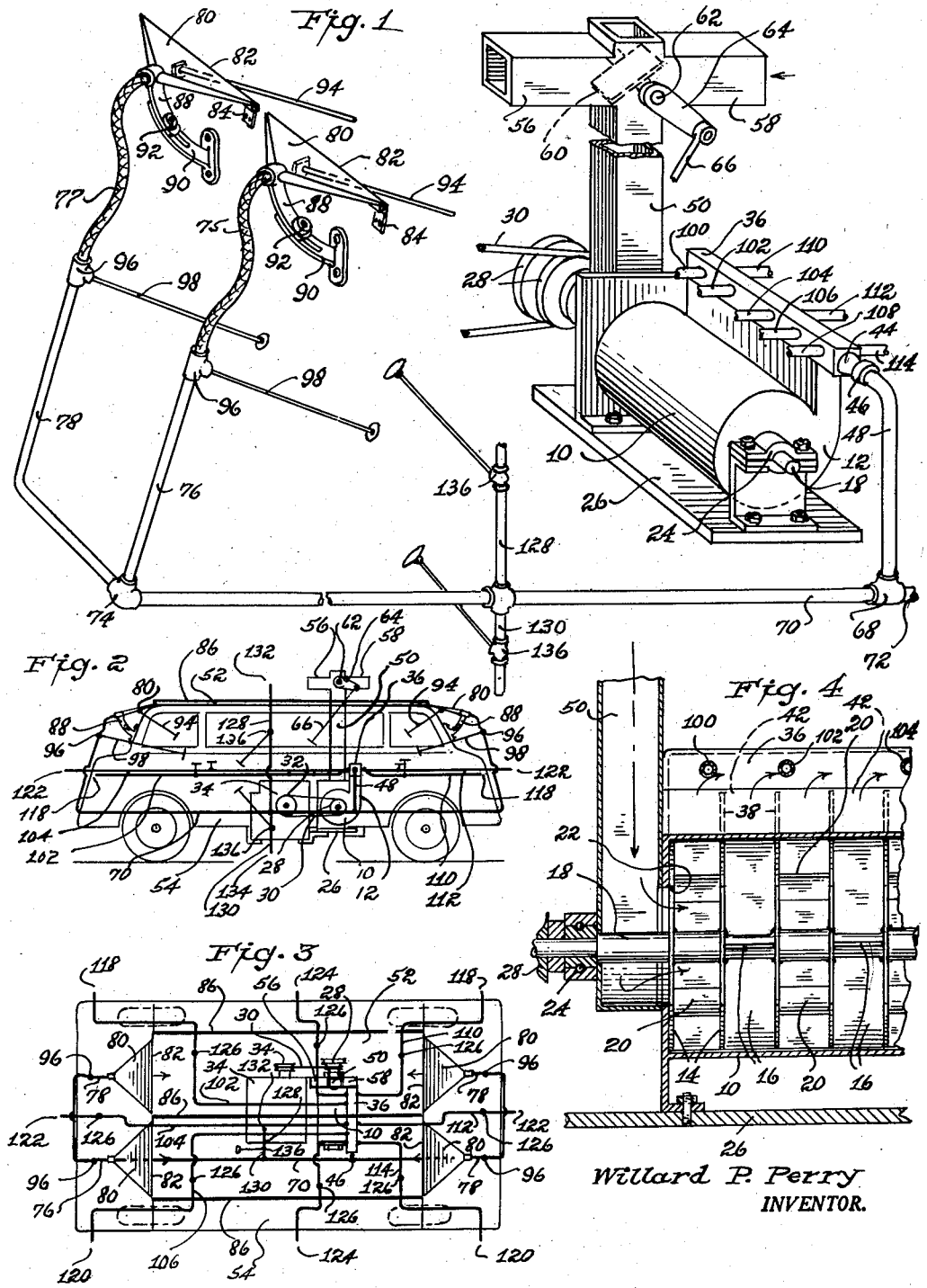

United States Patent Office 2,862,651
Patented Dec. 2, 1958

2,862,651

GRAVITY CONTROL APPARATUS

Willard P. Perry, near Titusville, N. J.

Application October 14, 1954, Serial No. 462,354

3 Claims. (Cl. 230—47)

This invention relates generally to high velocity blowers or air pressure generators and to the distribution and application of air pressure from such blowers or generators; and one of the principal objects of the present invention is to provide means in combination with an air pressure generator for relieving the atmospheric pressure on the top surface of an object to be lifted and propelled, such for example, as the top surface of the roof of a motor vehicle or other conveyance.

A further object of this invention is to provide means in combination with an air pressure generating system for propelling a conveyance in a forward or a rearward direction and also moving the conveyance laterally in either direction for purposes of steering the conveyance on the desired course.

Another object of the invention is to provide means in combination with an air pressure generating system wherein a vacuum created in the air inflow duct causes the atmospheric pressure against the outer surface of the duct wall to exert force to move a conveyance such as a vehicle, boat or other object to which the duct is attached, in one horizontal direction; and further to provide means whereby the direction of force of the atmospheric force of the atmospheric pressure can be reversed from inside the conveyance.

A further object of the present invention is to provide a conveyance of special construction in which the power and air pressure generating units are located at the center of the conveyance to facilitate lifting of the conveyance in a substantially level condition.

In one embodiment of my invention, I provide a high velocity blower having a plurality of vertical disks spaced equidistantly apart by connecting blades to form a rotatable unit arranged in a cylindrical volute casing in which air is drawn in from one end of the casing through a three-way duct which extends vertically from the blower through the roof of a conveyance in which the blower and the power units are located. The intake of air is controlled by means of a gate valve for closing either of two horizontal branches of the duct, leaving the other branch open to the atmosphere.

In the embodiment of my invention referred to above the volute casing is provided with vertical partitions which extend upwardly into a horizontal manifold, thereby dividing the volute chamber into a plurality of outflow channels corresponding to the number of disks in the rotatable blower unit. An air outlet pipe is connected to one end of the manifold, and from this pipe various conduits are connected to conduct the air pressure generated by the blower to jet nozzles, some of which are directed across the roof of the vehicle or other conveyance and others into the atmosphere adjacent the vehicle for steering and lifting functions. The roof of the conveyance may be either flat or curved as conditions may require.

Other objects and advantages of my invention will be apparent from the following specification and reference to the accompanying drawings forming a part thereof, in which Fig. 1 is a schematic perspective view of one form of blower unit and a pair of special jet nozzles which are adapted to be positioned at either end of the roof of a vehicle in accordance with my invention;

Fig. 2 is a diagrammatic view of a vehicle, in side elevation, showing my improved blower system applied thereto;

Fig. 3 is a diagrammatic view of the vehicle and blower system shown in plan;

Fig. 4 is a sectional view of one end of the blower unit, in side elevation, the disks and blades being shown in elevation;

Fig. 5 is a sectional view of the blower unit, in plan, with the disks and blades shown in elevation;

Fig. 6 is a top plan view of the blower unit, showing inflow and outflow ducts;

Fig. 7 is a section taken on the line 7—7 of Fig. 5; and

Fig. 8 is a detail sectional view of one of the jet nozzles.

Referring to the drawings in which like numerals designate like parts in the several views, 10 is a cylindrical casing having a volute chamber 12 extending along one side of its entire length and having therein a plurality of horizontally spaced disks 14. Between alternate pairs of the disks are radially arranged blades 16 extending from a central shaft 18 to the outer peripheral edges of the disks 14. Alternating between the pairs of disks mentioned are shorter radial blades 20 which extend only from the outer peripheral edges of the disks 14 to a central opening 22 formed in each of the disks. The shaft 18 is mounted in bearings 24 at each end of the casing 10, which bearings are in turn supported by the base 26 on which the casing 10 is mounted. Pulleys or sprocket wheels 28, which may be of varying diameters, are mounted on one end of the shaft 18 and connected by a belt or chain 30 to a pulley or sprocket wheel 32 on the power take off of a motor 34.

The volute chamber 12 extending upwardly along the entire length of the casing 10 and terminates in a horizontally arranged manifold 36. Partitions 38 are fixedly mounted in the volute chamber 40 below the manifold to divide the chamber into a plurality of ducts 42, which communicate with the manifold and the spaces between the disks 14. The outlet end of the manifold is coupled to an outlet connection 44, which may be reduced at its outer end and provided with a coupling 46 to which is connected an air pressure distribution pipe 48.

At the opposite end of the casing 10 is an air inflow or suction duct 50 which is approximately equal in area to that of each of the central disk openings 22. In the embodiment of the invention illustrated the wall of the duct 50 extends vertically from the blower to a plane above the roof 52 of a vehicle 54 (shown diagrammatically in Figs. 2 and 3) and terminates at its upper end in two horizontal branch ducts 56 and 58 extending in opposite directions longitudinally of the vehicle. A gate valve 60 (shown dotted in Fig. 1) is pivotally mounted transversely in the duct 50 between the branch ducts 56 and 58 in position for closing either of the branch ducts and leaving the other one open. The gate 60 is centrally mounted on a shaft 62 which extends outside the wall of duct 50 and carries an arm 64 to which is connected a rod 66 extending into the vehicle and providing a means of moving the gate valve to close either of the branch ducts. When one is closed the inflow of air will be through the other one. The suction of air by the blower through the duct 50 creates a vacuum in the inflow branch as well as the vertical portion of the duct. Therefore, the atmospheric pressure will exert a force against the back of the gate valve, in proportion to the area of the gate, tending to propel the vehicle in the reverse direction from that of the flow of air through the branch duct. The intensity of the vacuum and consequent propelling force may be reduced by partially opening the closed duct by means of the gate valve.

As indicated in dotted lines in Fig. 7, the number of short blades 20 in the blower unit may be increased, as desired, as, for example, in larger size units, or for any other reason. Four of the full length blades connected with shaft 18 are sufficient to support the disks in operation.

The vertical air pressure distribution pipe 48 is connected to a T fitting 68 to which are connected horizontal pipes 70 and 72 extending to the front and rear, respectively, of the vehicle 54. At the end of each pipe is a reducing fitting 74 to which are connected smaller branch pipes 76 and 78, at the outer ends of which are connected flat funnel shaped jet nozzles 80, having wide but very narrow air pressure outlets 82. These nozzles are hingedly attached by hinges 84 to the end of the vehicle 54, preferably directed upwardly at an angle of approximately 15 degrees at the rear top surface of the roof 52. The roof may be provided with longitudinal wall members 86 on each side of the nozzle outlets, thereby forming air channels along the top of the roof ahead of the nozzle outlets. Each nozzle 80 is provided with a support 88 having a foot portion 90 for attachment to the vehicle adjustably connected at 92 and through which the angle of the nozzle can be adjusted from inside the vehicle by means of a rod 94 which extends into the vehicle. A valve 96 is connected to each of the pipes 76 and 78 to control the low of air to the nozzles 80. The valves area each provided with a stem 98 extending into the vehicle. The pipes 76 and 78 may be provided with flexible hose sections 75 and 77 to permit angular adjustment of the jet nozzles.

Connected into the manifold 36 are pipes 100, 102, 104, 106, 108, 110, 112, and 114. Pipes 102 and 110 conduct air pressure to laterally directed jet nozzles 118 at the front and rear of one side of the conveyance 54, and pipes 106 and 114 supply air pressure to lateral jet nozzles 120 on the opposite side of the vehicle. Pipes 104 and 112 conduct air pressure to front and rear jet nozzles 122, and pipes 100 and 108 conduct air pressure to central lateral jet nozzles 124. Each of the pipes mentioned is provided with a valve designated by the common numeral 126, each of such valves being operable from inside the vehicle or other conveyance. A pair of vertical pipes 128 and 130 are connected to pipe 70 and conduct air pressure to vertically aligned, oppositely directed jet nozzles 132 and 134, the latter being directed downwardly. Each of the pipes 132 and 134 is provided with a control valve 136 operable from within the vehicle. It should be understood that all the control valves hereinbefore referred to have been illustrated schematically, and that in actual practice they will all be connected to a suitable operating unit whereby each valve can be easily operated conveniently from within a conveyance by a single person from one position.

As will be seen from the foregoing description, the air pressure generator in the embodiment of the invention illustrated essentially includes a plurality of fans arranged in parallel relation in a volute casing on a single shaft propelled by a motor. The casing has an air inlet duct at one end and a manifold communicating with the volute chamber. The manifold has an air pressure outlet at the end opposite the air inlet duct and a number of lateral air pressure outlets, the purposes of which will be hereinafter explained. Each fan consists of a pair of disks 14, each of which is provided with a central opening 22 and a plurality of spaced radially arranged blades 16 and 20, fastened to the disks therebetween, the longer blades 16 serving as spokes to support the disks on the shaft 18, as well as fan blades, and the shorter ones, which may greatly outnumber the longer ones, as fan blades, only.

In the blower construction mentioned above the air is free to flow through all the fans from the inflow duct 50; but, as the air stream flows in at atmospheric pressure, each fan rotating at high velocity will take its bite, so that by the time the inflow gets past four of the fans its volume and density will be lessened or rarefied by the action of the fans. For every cubic foot of air inflow there must first be an equal outflow. Thus, to maintain an inflow maximum of 1,100 feet per second or 13,200 per second, for example, there must be a corresponding volume of outflow. By reduction of the area of the outflow by one-half, for example, a proportionate suction or vacuum will be created in the duct 50. As previously mentioned, this will cause the atmospheric pressure to exert force against the back of the gate valve 60 in proportion to the area of the gate, tending to move a vehicle or any other object to which the duct is attached.

As already explained, all of the air conducting pipes communicating at one end with the manifold 36 are controlled by individual valves, so that air pressure may be discharged at will through any one or any number of the jet nozzles connected to the outlet ends of these pipes. Therefore, when, for example, it is desired to direct air pressure through funnel-shaped jet nozzles 80 at either end of the vehicle 54 against the top of the roof 52 the valves 96 at that end of the vehicle are opened to such extent as may be necessary to expel sufficient atmospheric pressure on the top of the roof to permit the atmospheric pressure underneath the vehicle to lift it from the ground, either completely or partially so that it will propel easily. The force of the air pressure along the roof of the vehicle, as well as the reactive force of the outflow of air through the jet nozzle will exert a reverse force tending to propel the vehicle in the reverse direction from that of the air outflow. Such force may be augmented if desired by manipulation of the gate 60 to cause atmospheric pressure against the gate to force the vehicle in the desired direction, irrespective of whether the vehicle is lifted entirely off the ground.

When the vehicle 54 is lifted off the ground it may be steered by either of the lateral jet nozzles 118 (Fig. 3). Jet nozzles 122 may also be used in forcing the vehicle in either direction. Vertical jet nozzles 132 and 134 may be used for quickly moving the vehicle in either direction vertically.

The motor 34 and the blower unit are so arranged at the center of gravity of the vehicle as to keep the vehicle in relatively balanced condition, and it is contemplated that any loading of the vehicle will also be kept in balanced arrangement. The vehicle may be so constructed as to have the same general formation at each end, so that it can travel in either direction. The vehicle or other conveyance may be of a type having wheels, or without wheels, as desired.

Obviously, various changes in construction and arrangement of the elements in my improved air pressure generating system and conveyance may be made within the spirit and scope of my invention. For example, instead of having jet nozzles only at each end of the roof of a conveyance, as illustrated, I may provide a series of jet nozzles along a roof having a large area of surface. Therefore, it should be understood that the construction shown and described is intended to be illustrative, only, and not limited to such specific construction.

I claim:

1. In apparatus of the class described, a fan unit comprising, in combination, a base, an elongated cylindrical casing mounted on said base, said casing curved laterally and upwardly from its bottom thereby forming an intercommunicating volute chamber and an upwardly projecting conduit extending along the entire length of said casing a manifold closed at one end and extending the entire length of said casing and conduit, said manifold being in open communication with said conduit, an upwardly projecting air inlet duct open at its outer end and communicating at its lower end with one end of said casing, a shaft extending centrally through said casing and journaled at its ends on said base, power means for rotating said shaft, a plurality of disks fixedly mounted on said shaft, said disks being equidistantly spaced apart and of a diameter to fit closely within said casing, and having central openings of approximately the area of said air inlet duct, a plurality of partitions in said volute chamber, said partitions being in parallel alignment with and having curved inner edges closely fitting around the adjacent edges of said disks, a plurality of blades fixedly attached to said disks between respective adjacent pairs, the outer edges of said blades being substantially coincident with the outer peripheries of said disks; and an air pressure conduit connected in communicating relation with the open end of said manifold.

2. A fan unit according to claim 1 in which the upwardly extending air inlet duct terminates in two horizontal, oppositely extending branch ducts, said branch ducts being provided with a pivotally mounted gate therebetween which in its central position will permit air from the blower to pass to the atmosphere through said duct and when said gate is in either of its closed or partially closed positions the open duct will be fully or partially exhausted of atmospheric pressure by the flow of compressed air from the blower, thereby leaving the preponderance of atmospheric pressure against the face of the gate opposite that of the open duct.

3. A fan unit according to claim 1 in which the partitions have extensions projecting upwardly from the volute chamber into the upwardly projecting conduit thereby dividing the volute chamber and conduit into separate ducts in communication with said manifold, said ducts being entirely closed from one another but in open communication with the spaces between said disks.

References Cited in the file of this patent

UNITED STATES PATENTS

| | | |
|---|---|---|
| 952,522 | Hendryx | Mar. 22, 1910 |
| 1,328,679 | Leonard | Jan. 20, 1920 |
| 1,553,201 | Sutton et al. | Sept. 8, 1925 |
| 1,770,593 | Johnson | July 15, 1930 |
| 1,845,136 | Dieter | Feb. 16, 1932 |
| 1,855,480 | Koslowski | Apr. 26, 1932 |
| 1,938,234 | Voorhees | Dec. 5, 1933 |
| 2,062,018 | Wheeler | Nov. 24, 1936 |
| 2,334,070 | Conley | Nov. 9, 1943 |
| 2,375,331 | Taylor | May 8, 1945 |
| 2,496,179 | Schwarz | Jan. 31, 1950 |
| 2,543,833 | Clark | Mar. 6, 1951 |
| 2,690,293 | Muhlberg | Sept. 28, 1954 |

FOREIGN PATENTS

| | | |
|---|---|---|
| 946,663 | France | Dec. 27, 1948 |